March 28, 1939.  L. T. JONES  2,152,194

ELECTRIC WELDING

Filed April 17, 1936

INVENTOR
LLOYD T. JONES
BY
Greenewald
ATTORNEY

Patented Mar. 28, 1939

2,152,194

UNITED STATES PATENT OFFICE 2,152,194

ELECTRIC WELDING

Lloyd T. Jones, Berkeley, Calif., assignor to Union Carbide and Carbon Research Laboratories, Inc., a corporation of New York Application April 17, 1936, Serial No. 74,849

11 Claims. (Cl. 219—10)

This invention relates to electric welding and the product produced thereby.

In Patent No. 2,043,960, issued to Lloyd T. Jones, Harry E. Kennedy and Maynard A. Rotermund jointly, on June 9, 1936, there is described and claimed a method of electric welding wherein the seam between the opposing edges of objects or work to be welded is filled with a welding composition in powdered or granular form, and the welding circuit is completed from an electrode or welding wire to the work through the welding composition into which the fusing end of the electrode is inserted. During a welding operation, as the electrode is fed to the work and simultaneously moved along the seam through the welding composition, the latter is locally fused at successive portions of the seam and forms a high resistance conductive path which supplies heat to fuse the end of the electrode and edges of the seam so that the molten metal from the electrode is deposited in the seam and coalesces with the fused edges thereof to provide a sound weld of uniform quality.

For any particular welding operation, the quality and type of weld produced is dependent upon several factors which include the penetration or extent of fusion of the edges of the objects being welded, the composition of the welding material or melt, the voltage and current employed, and the welding speed. When the desired welding speed is determined for a particular welding operation, a weld of desired width is produced. If the current and voltage remain constant and the welding speed is increased, the width of the weld produced decreases. Thus the decreasing width of the weld with increasing welding speed, the current and voltage of the welding circuit remaining constant, is one of the limiting factors to the maximum welding speed that can be attained.

In order to increase welding speeds, therefore, it has been necessary to increase the welding current to provide higher current densities at the welding zone. In many instances, it has generally not been desirable to increase the current density at the welding zone because objectionable and excessive penetration occurs at the lower edges of the seam or at the bottom of the welding groove. This is especially true when welding work wherein the bottom of the seam or groove is close to the underside or opposite face of the work, and also when welding relatively thin plates wherein the depth of penetration at the bottom of the weld becomes altogether too great with high current densities.

The object of this invention is to provide a method of controlling the deposition of metal on work in the process of electric welding wherein the welding is effected by the heat supplied by a highly fluid welding composition or melt which is in contact with both the fusing end of the electrode and the work.

The above and other objects and advantages of this invention will become apparent from the following description and accompanying drawing, in which.

Figure 5:
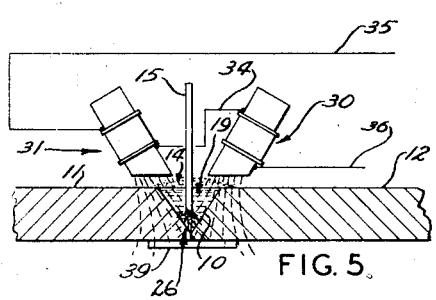
Fig. 5 is a transverse section of a seam similar to that shown in Fig. 1 with electromagnets disposed above the work at opposite sides of the seam adjacent the welding zone.
Figure 6:
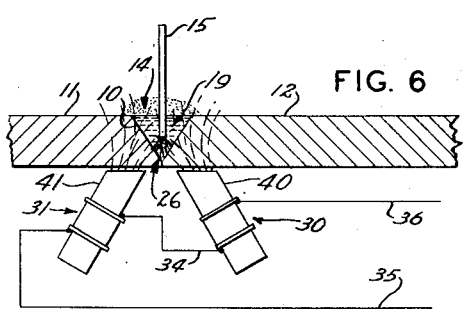
Figure 7:
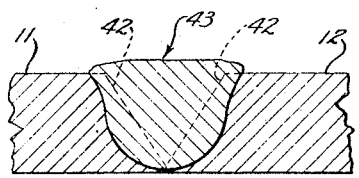
Figure 8:
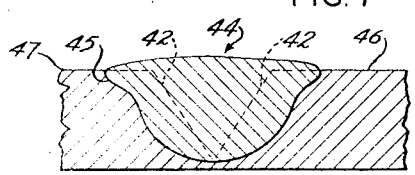

Fig. 6 is a transverse section of a seam similar to that shown in Fig. 5 and illustrates electromagnets positioned at the underside of the plates at opposite sides of the seam; and Figs. 7 and 8 diagrammatically illustrate the character of the completed welds produced when the welding is accomplished without a magnetic field adjacent the welding zone and with a magnetic field adjacent the welding zone, respectively.

Figure 1:
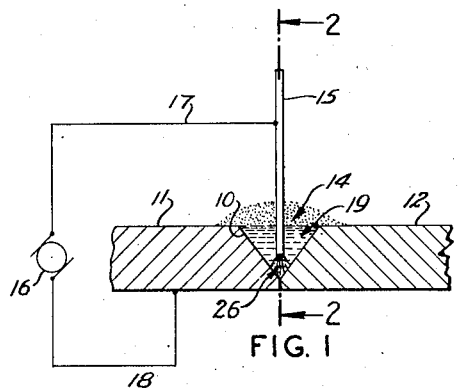
Fig. 1 is a transverse section of a seam formed between the opposing beveled edges of plates to be welded, and diagrammatically illustrates the welding zone and welding circuit.
Figure 2:
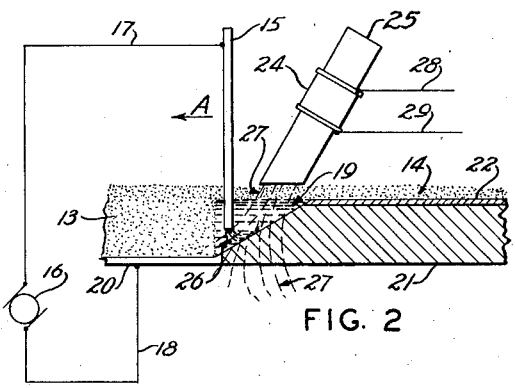
Fig. 2 is a longitudinal section of the seam shown in Fig. 1, and diagrammatically illustrates an electromagnet positioned over the seam adjacent the welding zone.

In the following description, like parts in the different figures of the drawing are designated by the same reference numerals. Referring to Figs. 1 and 2 which illustrate the process of electric welding disclosed in the patent referred to above, the groove or seam 10 formed between the opposing beveled edges of plates 11 and 12 adapted to be welded is filled with a high resistance welding composition 13 in powdered or granular form. Preferably an ample quantity of this material is used so that it forms a mound 14 extending lengthwise of the seam. An electrode 15 is inserted into the welding composition in the manner shown in Fig. 1, so that it is spaced from the plates 11 and 12. The welding circuit may comprise a source of electric energy 16 and conductors 17 and 18 connected to the electrode and work, respectively.

In order to complete the welding circuit to start a welding operation, suitable material, such as steel wool, is provided to bridge the gap between the end of the electrode 15 and the plates 11 and 12. The flow of current between the electrode and the work heats a region of the welding composition 13 so that it fuses and becomes a high resistance conductive path, and this region of fused or liquid material supplies heat to fuse the end of the electrode 15 and the edges of the plates 11 and 12. The molten metal deposited from the electrode coalesces with the fused edges of the plates, and the fused material and molten metal occupy the entire space forming the welding zone.

The electrode 15 is continuously fed toward the work and, after an interval of time, is moved along the seam 10 and through the welding composition or melt 13 at a uniform speed. At successive portions of the seam, the granular material 13 is locally fused and becomes highly fluid and superheated, as indicated at 19 in Fig. 2, whereby the liquid currents produced effectively mix the molten metal and welding composition to wash impurities out of the metal and separate the latter as it solidifies as an integral element of the plates being united. The progress of the welding operation is shown in Fig. 2 with the electrode 15 moving relatively to the work in the direction indicated by the arrow A. The welding composition 13 at the unwelded portion 20 of the seam ahead of the electrode 15 is in a powdered or granular state, while at the welded portion 21 of the seam the fused material has risen to the top of the weld and solidified, as shown at 22. In the welding operation just described, the excess amount of granular material, indicated at 14, remains unfused and covers the solidified layer 22.

In accordance with the present invention the deposition of electrode metal is controlled by providing a magnetic field which is adapted to displace or alter the lines of flow of current in the welding zone 19 comprising highly fluid welding composition and fused metal. By altering the flow of current in the welding zone, it has been possible to decrease the depth of penetration or fusion at the lower edges of a seam or bottom of a groove formed at the opposing edges of plates or objects to be welded, so that higher current densities and welding speeds can be effectively and safely employed without impairing the quality of the resultant weld produced.

One manner of practicing the present invention is shown in Fig. 2, wherein an electromagnet comprising a winding 24 and a core 25 extending therethrough is disposed adjacent the electrode 15 at the completed side 21 of the weld. The core 25 is positioned above the welding zone 19 and inclined toward the electrode 15 at an acute angle to the plates 11 and 12. In order to position the core 25 as close as possible to the plates 11 and 12, the lower end of the core is preferably beveled.

The lines of flow of current in the fluid welding composition and fused metal are indicated by the dotted lines 26, and extend downward and rearwardly of the electrode 15. The lines of magnetic flux due to the electromagnet, indicated by the broken lines 27, extend downward from the core 25 and intersect and are substantially perpendicular to the lines 26 indicating the flow of current. When an alternating current is supplied to the conductors 17 and 18 and the winding 24 of the electromagnet is connected through conductors 28 and 29 to a direct current source of supply, the magnetic field due to the electromagnet will be of substantially uniform intensity and effective to deflect the flow of alternating current in the fluid welding composition and fused metal alternately to one side and then the opposite side of the normal current path. When the lines of flow of current are disturbed and deflected, the new current path increases the temperature of the molten welding composition and fused metal in this path. This increase in temperature of the molten welding composition and fused metal in the new path effects additional heating at one side of the normal path and decreases the resistance to the flow of current in this new path. With this deflection of the lines of flow of current, the temperature of the welding composition and fused metal in the previous path immediately decreases so that the resistance of the previous path of current increases. Since the welding composition and fused metal in the new path of current flow becomes more conductive with heating, the lines of flow of current are readily deflected and shifted by the action of the magnetic field.

In deflecting the lines of flow of current alternately from one side to the opposite side of the normal current path, the path of flow of current is widened considerably, the only limitation being the boundary of the fluid welding composition and fused metal forming the welding zone 19. Although the path of flow of current is widened, the resistance of the fluid welding composition and fused metal as a whole remains substantially unchanged. Since the path of flow of current is widened, however, the heating generated or developed within the fluid welding composition is such that the depth of penetration or fusion at the lower portions of the edges of the plates or objects is diminished and there is less concentration of energy at the surface of the plates or objects opposite to that having the welding seam or groove.

With the electromagnet positioned at the completed side of the weld and maintained adjacent to the electrode 15 during its movement relative to the work, as shown in Fig. 2, the magnetic field is effective to decrease the depth of penetration or fusion at the lower portions of the edges of the plates and to increase the depth of penetration along the remaining portions of the edges of the plates toward the top surfaces of the plates. In this manner the depth of the resultant weld produced is effectively controlled and the width of the weld is increased. The intensity of the magnetic field provided determines the extent to which the lines of flow of current in the welding zone 19 are deflected, and this intensity may be controlled by varying the current supplied to the coil 24 of the electromagnet and the position of the core 25 with respect to the work surface. The polarity of the electromagnet does not appear to be of any particular importance, the same result being obtained when the lower end of the core 25 is either a north or south pole.

Figure 3:
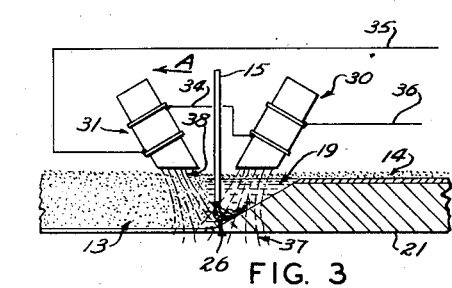
Fig. 3 is a longitudinal section of a seam similar to that shown in Figs. 1 and 2 with electromagnets positioned over the seam at the completed and uncompleted sides of the weld.

It has been found that the depth of penetration at the lower portions of a seam or bottom of a groove can be decreased when the electromagnet is placed in any position where the lines of flux of the magnetic field will intersect the lines of flow of current in the welding zone 19 and deflect or alter the path of current flow in the molten welding material and fused metal. In Fig. 3, for example, two electromagnets 30 and 31 are positioned above and parallel to the seam at the completed and uncompleted sides 21 and 20, respectively, of the weld. The electromagnets 30 and 31 may be connected in series relation through a conductor 34, and to a suitable source of electric energy through conductors 35 and 36. In this embodiment the lines of magnetic flux 37 and 38 extend obliquely downward into the welding zone 19 and intersect the lines of flow of current 26 in the molten welding material and fused metal to deflect and alter the lines of flow of current.

Figure 4:
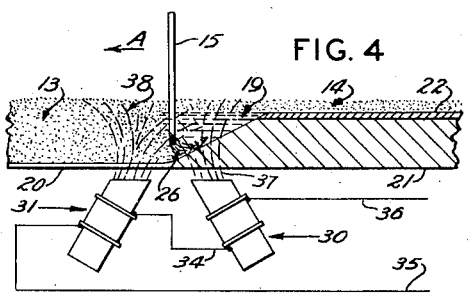
Fig. 4 is another longitudinal view of a seam similar to that shown in Figs. 1 and 2 with electromagnets positioned at the underside of the plates at the completed and uncompleted sides of the weld.

Instead of positioning the electromagnets 30 and 31 above the work, as shown in Fig. 3, these electromagnets may be positioned parallel to the seam at the underside of the work. Such an arrangement is shown in Fig. 4 with the electromagnets 30 and 31 positioned parallel with the seam being welded and at opposite sides of the electrode 15. In this embodiment, as in that just described and shown in Fig. 3, the lines of flux 37 and 38 are effective to intersect and deflect the lines of flow of current in the molten welding material and fused metal at the welding zone.

The depth of penetration at the lower portions of a seam or bottom of a groove has also been decreased by providing a magnetic field which is transverse to the direction of welding, the electromagnets being disposed either above or below the work surface. In Fig. 5 is shown one such arrangement with electromagnets 30 and 31 disposed above the plates 11 and 12 at opposite sides of the seam 10 adjacent the welding zone 19. In many instances a backing-up bar 39 is employed, such bar being maintained in position at the seam against the underside of the work.

Sometimes it is not possible to employ a backing-up bar, and in such instances it has been found desirable to employ electromagnets positioned at the underside of the work surface to limit the depth of penetration at the lower portions of the seam. This modification is shown in Fig. 6 with the electromagnets 30 and 31 arranged transverse to the seam 10 and at opposite sides of the welding zone 19. Although the cores 40 and 41 of these electromagnets may be spaced from the plates 11 and 12, it may sometimes be desirable to position the electromagnets so that the cores almost but not quite contact the underside of the plates. This is particularly advantageous when no backing-up bar is employed because, as the depth of penetration of the weld tends to increase at the lower portions of the seam, the lines of flow of current in the welding zone approach the portion of the magnetic field of greatest intensity. In this manner it is possible to control or limit automatically the depth of penetration of the weld at the bottom of the seam.

Experiments which have been carried out conclusively prove that the provision of a magnetic field, as described above, permits precise control of the deposition of metal on metallic surfaces. When a weld was made on a solid plate ½ inch in thickness at a welding speed of 12 inches per minute without employing a magnetic field, the voltage and current of the welding circuit being 40 volts and 880 amperes, respectively, the depth of penetration of the weld vertically into the plate was 0.360 of an inch and the width of the resultant weld was 0.730 of an inch. By providing a direct current magnetic field in the manner shown in Fig. 2 and described above, it was possible to decrease the depth of penetration vertically into the plate to 0.140 of an inch and to increase the width of the resultant weld to 0.950 of an inch.

The advantages of providing a magnetic field to decrease or limit the depth of penetration of the weld at the bottom of a seam or groove can be indicated in the welding of steel plates about 1/4 of an inch thick. When no magnetic field is employed, a welding current of 400 amperes produces a depth of penetration at the bottom of the seam which is relatively high for welding plates of this thickness. When a magnetic field is provided to decrease the depth of penetration of the weld toward the underside of the plates, it has been possible to employ welding currents as high as 1100 amperes without producing excessive penetration; and at these higher values of welding current the speed of welding is increased tremendously.

The fact that the lines of flow of current in the welding zone readily move and deflect from the normal current path, when under the influence of a magnetic field, is believed to be due to the fact that the molten welding composition and fused or molten metal occupy the entire space of the welding zone, so that the molten welding composition is constantly maintained in contact with the fusing end of the electrode and the fused edges of the objects to be united. The moving of the lines of flow of current in the molten welding composition and fused metal is similar to the Hall effect, wherein the lines of flow of current are magnetically displaced in an electrical conductor. Whereas the flow of current can readily be deflected and altered in the molten welding composition and fused metal, as described above, the lines of flow of current in a conductor can be so displaced only a relatively small amount because the new path of flow of the current is necessarily a higher resistance path and the previous path of lower resistance is always available.

The result produced by the magnetic field in the process of welding described above is entirely different from that produced when a magnetic field is employed in electric arc welding. Regardless of the manner in which a magnetic field is employed with electric arc welding, it has never been possible to increase the width of an arc weld or to reduce the depth of penetration at the lower portions of the weld. In electric arc welding the use of a magnetic field tends to decrease the width of the resultant weld and increase the depth of penetration at the bottom of the weld. Under the same operating conditions as in the first example given above, the use of the magnetic field in electric arc welding with an uncoated welding rod decreased the width of the resultant weld from 0.800 to 0.520 of an inch and increased the depth of penetration of the weld vertically into the plate from 0.280 to 0.290 of an inch. On the other hand, it has never been possible to increase the depth of penetration at the bottom of the weld or decrease the width of the welding when employing a magnetic field with the present welding process in which the welding heat is derived from the superheated molten welding material at the welding zone.

In carrying out the present welding process with the use of a magnetic field, it is imperative that a welding composition be used in which the chemical reactions between the constituent elements have been completed so that the welding material or melt is chemically inert and will not evolve deleterious amounts of gases during the welding operation. Further, the fluidity of the welding material or melt at the welding temperature should be such that it will not become entrained with the molten metal. The principal ingredients of the high-resistance welding material or melt preferably used consist of silica, one or more silicates of alkaline earth metals, and alumina, and these ingredients are prefused in any suitable manner, as in an electric furnace. A halide salt, such as calcium fluoride, may be added to the mixture before or after the other ingredients have been fused and cooled. The molten mixture is preferably cooled rapidly in such a manner that the solidified material is characterized by a vitreous luster on fracture. It is important that the material, after cooling and grinding, be substantially free from iron oxides uncombined with other ingredients of the composition and from other materials, such as carbonates or moisture, which evolve detrimental amounts of gas or vapor at welding temperatures. The analyses by weight of representative melts which have been successfully used in practicing the present invention are given below. These melts have a negative temperature coefficient of electrical resistance:

| Percent of | I | II | III | IV |
|---|---|---|---|---|
| CaO | 29.5 | 31.24 | 29.15 | 40.12 |
| MgO | 8.7 | 11.01 | 8.26 | 0.89 |
| $SiO_2$ | 56.4 | 52.40 | 57.48 | 52.94 |
| $Al_2O_3$ | 5.4 | 4.11 | 4.86 | 5.80 |
| $Fe_2O_3$ | Low | 0.13 | 0.24 | 0.23 |

Before use, about 1 part of calcium fluoride was added to 16 parts, by weight, of each of the above compositions.

The characteristic types of welds produced when the above-described method of welding is employed without and with the provision of a magnetic field adjacent to the welding zone are diagrammatically illustrated in Figs. 7 and 8, respectively. The dotted lines 42 in these figures indicate the beveled edges at the opposing faces of the plates 11 and 12 which were formed preparatory to welding. In the weld 43 in Fig. 7, which was produced without the provision of a magnetic field, it will be seen that the sides of the completed weld are relatively steep, with the width of the weld at the top surfaces of the plates 11 and 12 being slightly greater than the width of the original seam. In the weld 44 in Fig. 8, which was produced with the magnetic field adjacent to the welding zone, the side walls of the completed weld have a greater slope than the side walls of the weld illustrated in Fig. 7. It will also be apparent that the depth of penetration at the bottom of the seam is less in Fig. 8 than in Fig. 7 and that the deflection of the lines of flow of current during the welding of the joint shown in Fig. 8 has effected greater penetration near the top portions of the plate edges and increased the width of the resultant weld considerably throughout its entire depth. A characteristic feature of the welds produced on flat and curved plates with a magnetic field adjacent the welding zone is the pronounced and decided lip formation 45 at the edges of the weld adjacent to the top surfaces of the plates 46 and 47.

In place of an electromagnet or electromagnets, one or more strong permanent magnets may be employed to deflect or move the lines of flow of the alternating current in the molten welding composition and fused metal at the welding zone. A permanent magnet of cobalt steel, for example, will in many instances provide a magnetic field of sufficient intensity to control the depth of penetration of the weld at the lower portions of a seam or groove, the adjustment of the field strength with a permanent magnet being obtained by changing the position of the magnet.

When alternating current is used in welding, control of the depth of the penetration of the weld at the lower portions of a seam may also be obtained by connecting the electromagnets to an alternating current source of supply to provide an alternating current magnetic field of such a character that the lines of flow of current are displaced or altered. In certain instances the winding of the electromagnet may be connected directly in the welding circuit to provide an alternating magnetic field of such a character that the depth of penetration of the weld is controlled. The magnetic field, either alternating or direct in character, may also be used when direct current is employed in the welding circuit. In each instance the magnetic field may be of such a character that it is effective to reduce the depth of penetration of the weld at the lower portions of a seam.

In view of the foregoing it will be seen that, by providing a magnetic field to decrease the depth of penetration of the weld, higher welding currents can be used, so that welding operations can be carried out at much greater speeds with the consequent economies in labor and overhead costs.

While different methods of practicing the present invention have been described and shown, it is intended that they shall be interpreted as illustrative of the scope of the invention and not in a limiting sense.

What is claimed is:

1. A method of electric welding which comprises providing an unbonded granular non-metallic material of high electrical resistance and having a negative temperature coefficient of resistance in full contact with all the surfaces to be united by welding; inserting an electrode into said material; passing, from said electrode through said material to said surfaces, an electric current of sufficient magnitude to melt progressively the portion of the electrode in said material and to heat and melt progressively a definite quantity of said material; and applying a magnetic field to such molten material in such a manner that the lines of flux of said magnetic field intersect the lines of flow of current in said molten material thereby to displace laterally said lines of flow of current to increase the lateral penetration of the welding heat in said surfaces and consequently to decrease the vertical penetration of the heat therein.

2. A method of electric welding which comprises providing an unbonded granular non-metallic material of high electrical resistance and having a negative temperature coefficient of resistance in full contact with all the surfaces to be united by welding; inserting an electrode into said material; passing, from said electrode through said material to said surfaces, an alternating electric current of sufficient magnitude to melt progressively the portion of the electrode in said material and to heat and melt progressively a definite quantity of said material; and applying a magnetic field to such molten material in such a manner that the lines of flux of said magnetic field intersect the lines of flow of current in said molten material thereby to displace laterally alternately to one side and then to the opposite side said lines of flow of current to increase the lateral penetration of the welding heat in said surfaces and consequently to decrease the vertical penetration of the heat therein.

3. A method of electric welding which comprises providing an unbonded granular non-metallic material of high electrical resistance and having a negative temperature coefficient of resistance in full contact with all the surfaces to be united by welding; inserting an electrode into said material; passing, from said electrode through said material to said surfaces, an electric current of sufficient magnitude to melt progressively the portion of the electrode in said material and to heat and melt progressively a definite quantity of said material; applying a magnetic field to the resulting molten mass in such a manner that the lines of flux of said magnetic field intersect the lines of flow of current in said molten mass; and rapidly reversing the direction of said lines of flux thereby to displace laterally alternately to one side and then to the opposite side said lines of flow of current to increase the lateral penetration of the welding heat in said surfaces and consequently to decrease the vertical penetration of the heat therein.

4. A method of electric welding which comprises providing an unbonded granular non-metallic material of high electrical resistance and having a negative temperature coefficient of resistance in full contact with all the surfaces to be united by welding; inserting an electrode into said material; passing, from said electrode through said material to said surfaces, an electric current of sufficient magnitude to melt progressively the portion of the electrode in said material and to heat and melt progressively a definite quantity of said material; and applying a magnetic field rearwardly of said electrode in such a manner that the lines of flux of said magnetic field extend substantially parallel to said surfaces and intersect at right angles the lines of flow of current in the resulting molten mass thereby to displace laterally said lines of flow of current to increase the lateral penetration of the welding heat in said surfaces and consequently to decrease the vertical penetration of the heat therein.

5. A method of electric welding which comprises providing an unbonded granular non-metallic material of high electrical resistance and having a negative temperature coefficient of resistance in full contact with all the surfaces to be united by welding; inserting an electrode into said material; passing, from said electrode through said material to said surfaces, an alternating electric current of sufficient magnitude to melt progressively the portion of the electrode in said material and to heat and melt progressively a definite quantity of said material; and applying a magnetic field rearwardly of said electrode in such a manner that the lines of flux of said magnetic field extend substantially parallel to said surfaces and intersect at right angles the lines of flow of current in the resulting molten mass thereby to displace laterally alternately to one side and then to the opposite side said lines of flow of current to increase the lateral penetration of the welding heat in said surfaces and consequently to decrease the vertical penetration of the heat therein.

6. A method of electric welding which comprises providing an unbonded granular non-metallic material of high electrical resistance and having a negative temperature coefficient of resistance in full contact with all the surfaces to be united by welding; inserting an electrode into said material; passing, from said electrode through said material to said surfaces, an electric current of sufficient magnitude to melt progressively the portion of the electrode in said material and to heat and melt progressively a definite quantity of said material; applying a magnetic field rearwardly of said electrode in such a manner that the lines of flux of said magnetic field extend substantially parallel to said surfaces and intersect at right angles the lines of flow of current in the resulting molten mass; and rapidly reversing the direction of said lines of flux thereby to displace laterally alternately to one side and then to the opposite side said lines of flow of current to increase the lateral penetration of the welding heat in said surfaces and consequently to decrease the vertical penetration of the heat therein.

7. A method of electric welding which comprises providing an unbonded granular non-metallic material of high electrical resistance and having a negative temperature coefficient of resistance in full contact with all the surfaces to be united by welding; inserting an electrode into said material; passing, from said electrode through said material to said surfaces, an electric current of sufficient magnitude to melt progressively the portion of the electrode in said material and to heat and melt progressively a definite quantity of said material; and applying a magnetic field from a point above said surfaces to the resulting molten mass in such a manner that the lines of flux of said magnetic field extend substantially parallel to said surfaces and intersect at right angles the lines of flow of current in said molten mass thereby to displace laterally said lines of flow of current to increase the lateral penetration of the welding heat in said surfaces and consequently to decrease the vertical penetration of the heat therein.

8. A method of electric welding which comprises providing an unbonded granular non-metallic material of high electrical resistance and having a negative temperature coefficient of resistance in full contact with all the surfaces to be united by welding; inserting an electrode into said material; passing, from said electrode through said material to said surfaces, an electric current of sufficient magnitude to melt progressively the portion of the electrode in said material and to heat and melt progressively a definite quantity of said material; and applying a magnetic field from beneath said surfaces to the resulting molten mass in such a manner that the lines of flux of said magnetic field intersect at right angles the lines of flow of current in said molten mass thereby to displace laterally said lines of flow of current to increase the lateral penetration of the welding heat in said surfaces and consequently to decrease the vertical penetration of the heat therein.

9. A method of electric welding which comprises providing an unbonded granular non-metallic material of high electrical resistance and having a negative temperature coefficient of resistance in full contact with all the surfaces to be united by welding; inserting an electrode into said material; passing, from said electrode through said material to said surfaces, an electric current of sufficient magnitude to melt progressively the portion of the electrode in said material and to heat and melt progressively a definite quantity of said material; and applying a magnetic field to the resulting molten mass at either side of said electrode in such a manner that the lines of flux of said magnetic field extend substantially transversely of said surfaces and intersect at right angles the lines of flow of current in said molten mass thereby to displace laterally said lines of flow of current to decrease the vertical penetration of the welding heat in said surfaces.

10. A method of producing a fillet weld at a seam formed between two metal members disposed substantially perpendicular to each other, wherein a fusible metal electrode is inserted into a body of unbonded granular welding material of high electrical resistance and having a negative temperature coefficient of resistance, said material being placed on and along the seam formed between said members, the end of said electrode being spaced from said members, such method comprising passing an electric current of sufficient magnitude through said electrode, said welding material and said members to fuse and maintain said welding material in a highly fluid state in a region forming a welding zone, said highly fluid welding material occupying the entire space forming the welding zone and constantly being in contact with said electrode and said members to supply welding heat thereto to fuse said electrode and cause such fused metal to deposit and coalesce with fused metal at the opposing edges of said metal members, feeding said electrode toward said members and moving the electrode longitudinally relatively to the seam through said body of welding material, and constantly maintaining a magnetic field adjacent to the welding zone, the lines of flux of said magnetic field intersecting the lines of flow of current in said fluid welding material and said fused metal to displace laterally said lines of flow of current thereby to increase the lateral penetration of the welding heat and provide a weld having its exposed surface terminating at and contiguous to the metal at the surfaces of said members.

11. A method of electric welding which comprises providing an unbonded granular non-metallic material of high electrical resistance and having a negative temperature coefficient of resistance in full contact with all the surfaces to be united by welding, said material containing a major portion of fused silicates and being substantially free from uncombined iron oxide and from substances capable of evolving large amounts of gases under welding conditions; inserting an electrode into said material; passing, from said electrode through said material to said surfaces, an alternating electric current of sufficient magnitude to melt progressively the portion of the electrode in said material and to heat and melt progressively a definite quantity of said material; and applying a magnetic field to such molten material in such a manner that the lines of flux of said magnetic field intersect the lines of flow of current in said molten material thereby to displace laterally alternately to one side and then to the opposite side said lines of flow of current to increase the lateral penetration of the welding heat in said surfaces and consequently to decrease the vertical penetration of the heat therein.

LLOYD T. JONES.